United States Patent
Williams

[11] 3,894,134
[45] July 8, 1975

[54] METHOD OF MAKING REINFORCED POLYESTER SHEETS

[75] Inventor: David R. Williams, Vandergrift, Pa.

[73] Assignee: Koppers Company, Inc., Pittsburgh, Pa.

[22] Filed: Jan. 2, 1973

[21] Appl. No.: 320,006

[52] U.S. Cl... 264/171; 260/29.6 NR; 260/29.6 RB; 260/29.6 WQ; 260/40 R; 264/174; 264/212; 264/257; 264/313

[51] Int. Cl............................ B29d 3/02; B29d 7/02

[58] Field of Search . 260/29.6 R, 29.6 M, 29.6 PM, 260/31.8 G, 40 R, 874, 875, 885, 862, 29.6 NR, 29.6 RB, 29.6 WQ; 264/171, 174, 255, 254, 257, 258, 331, 336, 131, 109, 165, 212, 240, 241, 245, 259, 260, 137, 313

[56] References Cited
UNITED STATES PATENTS

| | | | |
|---|---|---|---|
| 2,744,044 | 5/1956 | Toulmin | 260/40 R X |
| 2,843,556 | 7/1958 | Moorman | 260/862 X |
| 3,466,259 | 9/1969 | Jernigan | 260/37 R |
| 3,551,378 | 12/1970 | Rabenold et al. | 260/862 X |
| 3,637,911 | 1/1972 | Baum et al. | 260/40 R X |
| 3,665,055 | 5/1972 | Hatton | 260/862 |
| 3,686,111 | 8/1972 | Marhlouf et al. | 260/34.2 X |

OTHER PUBLICATIONS

Conant, The Chemistry of Organic Compounds, MacMillan (N.Y.), (1939) pp. 95 & 96, relied on.

Primary Examiner—Robert F. White
Assistant Examiner—W. E. Hoag
Attorney, Agent, or Firm—Synnestvedt & Lechner; Oscar B. Brumback

[57] ABSTRACT

A low shrink, chemically thickened, fibrous reinforced, cureable polyester resin mat is prepared by first formulating and then combining two viscosity stable portions of the ingredients, one portion containing an unsaturated polyester and part of the crosslinking agent therefor, and water, and the other portion containing the remainder of the crosslinking agent, calcium oxide (chemical thickening agent) and a thermoplastic polymer having anhydride groups.

9 Claims, 1 Drawing Figure

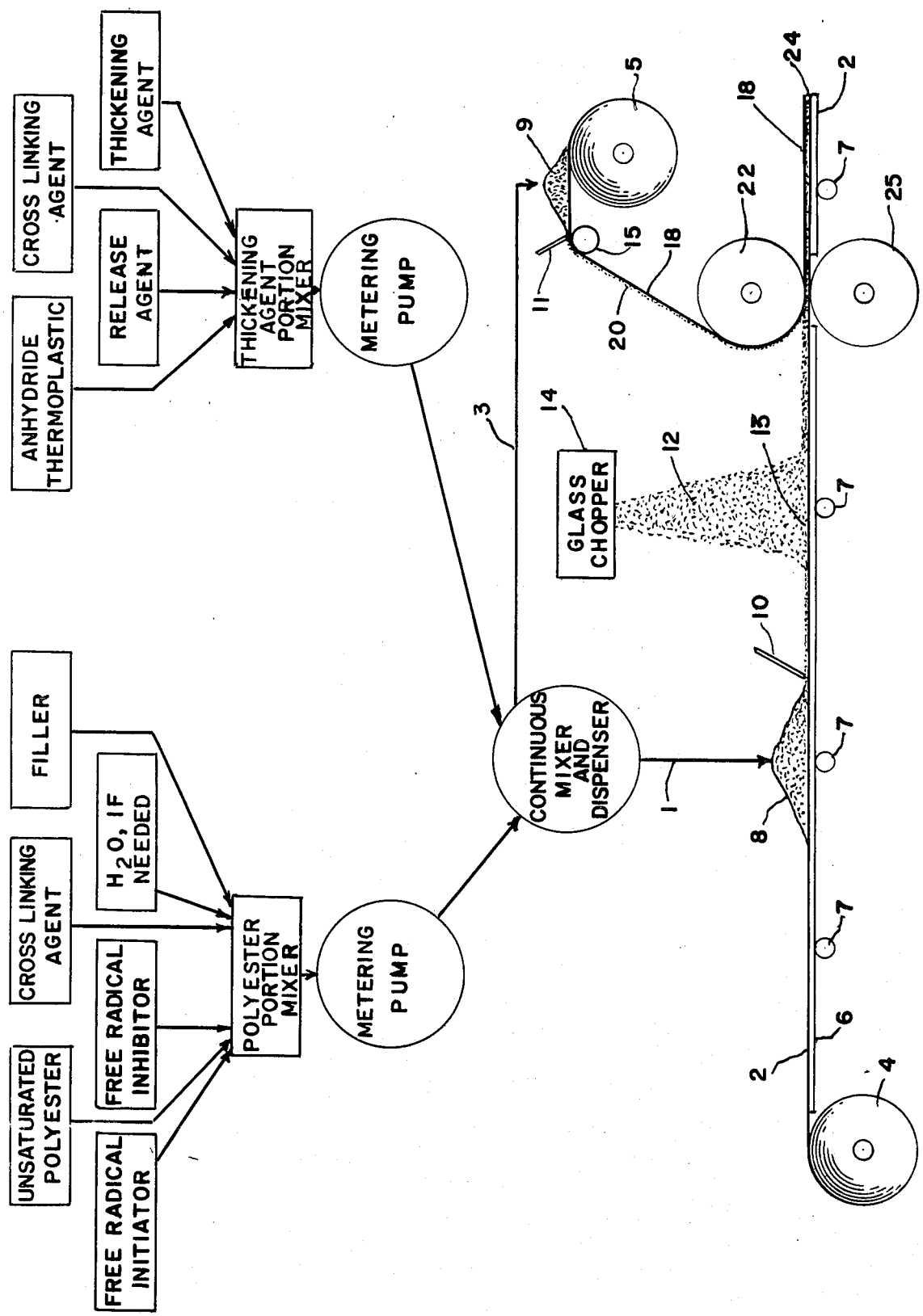

METHOD OF MAKING REINFORCED POLYESTER SHEETS

FIELD OF THE INVENTION

This invention relates to polymerizable polyester resin mats which can be molded and polymerized into articles.

The fabrication of thermoset polyester resin articles from polymerizable compositions comprising an ethylenically unsaturated polyester dissolved in a liquid ethylenically unsaturated monomeric crosslinking agent which is capable of polymerizing with said polyester is well known. By incorporating fibrous reinforcements, such as glass fibers, in the polymerizable polyester resin formulation (as is usually done), articles having relatively high strength and low density can be produced. Usually, fillers, such as calcium carbonate and clays, are added to the resin formulation to extend it.

A relatively recent development in the polyester resin art is the production of articles having smooth surface properties by including in the resin formulation a thermoplastic polymer which is soluble in the crosslinking agent of the formulation. The thermoplastic polymer functions in a manner such that it reduces the shrinkage of the polymerizable formulation as it cures, and in some cases, it causes the formulation to expand as it cures. It is well known that conventional polyester formulations can shrink as much as 10 percent by volume as they polymerize. The rough surface properties, which may be considered undesirable for some applications, of polyester articles have been attributed at least in part to this shrinking characteristic.

A few examples of thermoplastic polymers that have been reported to reduce the shrinkage of the formulation, or effect its expansion as it cures, include homopolymers of styrene, lower alkyl methacrylates and acrylates; copolymers of methacrylates and lower alkyl esters of acrylic acid or methacrylic acid.

It is known also to add to the aforementioned type of polyester resin formulations chemical thickening agents which thicken or increase the viscosity of the otherwise readily flowable liquid resin formulation. Examples of such chemical thickening agents include magnesium oxide and magnesium or calcium hydroxide. The chemically thickened polyester resin formulation can be formed readily into a curable or polymerizable polyester resin mat (also referred to commonly as a prepreg) which can be molded under heat and pressure into the desired article. The use of such mats has a number of advantages over fabricating the articles from a liquid polyester resin formulation or a "filler thickened" formulation. The mats can be handled very easily, material waste is relatively small in amount, and intricately shaped articles can be made relatively quickly.

Although the aforementioned thermoplastic polymers can be incorporated into the aforementioned thickened polyester resin mats to produce cured articles having smooth surface properties, the use of such thermoplastic polymers has some disadvantages. One of the major disadvantages is that the aforementioned type of thermoplastic polymers cannot be maintained intimately and homogeneously dispersed throughout the thickened resin mat during the thickening process, and they tend to exude therefrom upon being molded and cured. This creates various problems. For example, it has been found that articles made from mats containing the aforementioned thermoplastic polymers have surfaces which are mottled. This detracts greatly from their appearance. Also, it has been found that such mats, when molded under heat and pressure, leave substantial deposits of the thermoplastic polymer on the surface of the mold. If such deposits are allowed to accumulate, they can have an adverse effect on the surface properties of subsequently molded articles. Cleaning the mold surfaces is, of course, a time-consuming job.

It has been reported that the aforementioned problems can be minimized or avoided by using a thermoplastic polymer which contains acid functionality, for example, a thermoplastic polymer containing carboxyl groups

Examples of acid functional thermoplastics are those prepared by copolymerizing monomers such as styrene, alkyl methacrylates, alkyl acrylates, or acrylonitrile with acid functional monomers such as acrylic acid, methacrylic acid, maleic acid, and itaconic acid. Another type of thermoplastic polymer which can be incorporated into the thickened polyester resin formulation for the purpose of avoiding the aforementioned problems is styrene-maleic anhydride copolymer (see U.S. Pat. No. 3,665,055 to Hatton and McNally assigned to the same assignee as this invention). It is believed that the aforementioned acid functional thermoplastic polymers and styrene-maleic anhydride copolymer are maintained in the thickened resin mat in an intimately and homogeneously dispersed form as a result of co-action with the aforementioned chemical thickening agents. Thermoplastic polymers which so function are referred to hereafter as "thickenable thermoplastics."

On the other hand, it appears that the other type of thermoplastic polymers referred to previously hereinabove do not co-act with the chemical thickening agents. Instead of being intimately and homogeneously dispersed throughout the thickened resin mat, they exist therein in the form of globules which exude from the mat as mentioned above. Such thermoplastic polymers are referred to hereinafter as "non-thickenable thermoplastics."

Although articles having excellent properties have been manufactured readily from the thickened polyester resin mats described above, preparation of the mats by heretofore known methods has been problem prone. Speaking generally, the mats have been prepared by feeding the thickenable polyester resin formulation in liquid or paste form onto a sheet, such as a polyethylene film, carried on a conveyor belt. Fibrous reinforcements, such as chopped glass fibers, are then fed onto the thickenable polyester resin formulation. The resulting composition is spread evenly over the carrier sheet as it is passed under a doctor blade. Thereafter, a top sheet covered with additional thickenable polyester resin formulation in paste-like form is applied to the fibrous filled thickenable formulation and the resulting sandwich is fed through pressure rollers which force the thickenable polyester resin formulation and fibrous reinforcements together.

One of the principle requirements for producing a satisfactory polyester resin mat by this method is that the thickenable polyester resin formulation be of a sufficiently low viscosity to wet adequately the fibrous reinforcements when these two constituents are compacted.

If the formulation is incapable of wetting the fibrous reinforcements adequately because it has too high a viscosity, the article produced from the resulting mat has reduced strength. In order to avoid this, the thickening agent, upon being added to the resin formulation, should not thicken it to the extent that it is incapable of wetting the fibrous reinforcements which are added subsequently. On the other hand, once the fibrous reinforcements are well wetted with the resin formulation, the thickening agent should function to increase the viscosity of the formulation as rapidly as possible so that the resin mat can be removed promptly from the conveyor belt in a form which is readily handleable.

In preparing the aforementioned mats, it would appear that the simplest and most straightforward way of combining the ingredients of the formulation, other than the fibrous reinforcements, is to mix them in a container and feed them onto the carrier sheet. However, this method has not met with success. In preparing the mats on an industrial scale, it has been found to be very difficult to incorporate all of the chemical thickening agent, which exists in powdered form, uniformly throughout the formulation in the absence of portions of the formulation thickening to the degree that it is incapable of wetting satisfactorily the fibrous reinforcements applied subsequently.

It is not desirable to initially add the fibrous reinforcements to the formulation because they are degraded as the ingredients thereof are mixed.

This invention is related to an improved method for preparing thickened, polymerizable polyester resin mats which contain a thermoplastic polymer.

REPORTED DEVELOPMENTS

In general, heretofore known methods for incorporating the chemical thickening agent into the polyester resin formulation have involved preparing two portions of the resin formulation, one containing the polyester and the other containing the thickening agent in a form which can be readily mixed into the portion containing the polyester. The purpose of such methods is to keep the thickening agent out of contact with the polyester so that it does not prematurely thicken it, while the ingredients comprising the "polyester" portion are mixed thoroughly; thereafter the "thickening agent" portion is mixed quickly with the "polyester" portion. However, as will be seen from the discussion which follows, efforts in this direction have met with problems.

One such method has involved the preparation of two portions of the resin formulation, one portion containing the unsaturated polyester, part of the crosslinking agent, the thermoplastic polymer, and the filler, and the other portion comprising the rest of the crosslinking agent and the chemical thickening agent. However, it has been found that the chemical thickening agent, which as mentioned above is in powdered form, tends to settle from the liquid crosslinking agent. This can be avoided and the thickening agent can be dispersed uniformly in the crosslinking agent by adding thereto the thermoplastic polymer which, upon dissolving in the crosslinking agent, functions to increase the viscosity of the portion to the extent that the chemical thickening agent remains dispersed uniformly therein. However, the thermoplastic polymer used must be of the non-thickenable type; otherwise, the chemical thickening agent co-acts with the thermoplastic polymer and increases the viscosity of the portion to the extent that it is difficult to combine it with the portion of the formulation containing the unsaturated polyester and other ingredients. However, the use of a non-thickenable thermoplastic results in the formation of a resin mat which has the problems referred to hereinabove.

In order to reduce the severity of these problems, it has been proposed to prepare the resin mats from both types of thermoplastics, that is, the thickenable and non-thickenable type. The thickenable thermoplastic is added to the polyester portion of the formulation and the non-thickenable thermoplastic is incorporated into the thickening agent portion to maintain the thickening agent dispersed uniformly therein. However, this method of preparing the resin formulation has disadvantages in that the resin mat contains non-thickenable thermoplastic which is the source of problems heretofore described. Also the non-thickenable thermoplastic is an additional material which must be inventoried and handled.

By way of additional background it is noted that in preparing the two portions of the formulation, efforts are made to combine the ingredients of each formulation in a manner such that the two portions have approximately the same viscosities. This affords more readily pumping and mixing of the two portions. Also, it is desirable to combine the ingredients of each formulation in a manner such that both portions can be combined in approximately equal volumetric ratios. This avoids the need of having to have extreme pumping accuracy.

In view of the above, it is an object of the present invention to provide improved means for preparing thickenable polymerizable polyester resin mats containing a thermoplastic polymer.

SUMMARY OF THE INVENTION

The present invention is directed to the provision of a polyester resin formulation, from which the aforementioned type of resin mats can be prepared, by first preparing different portions of the formulation, the ingredients of each of the portions being capable of being thoroughly mixed to form a homogeneous mixture of the ingredients in the absence of a significant change in the viscosity of the portions, and each of the portions being capable of being intermixed readily to thoroughly and uniformly distribute throughout the resulting resin formulation the ingredients thereof in the absence of an increase in viscosity to the extent that the resin formulation is incapable of wetting adequately fibrous reinforcements which are combined subsequently with the resin formulation.

In accordance with the present invention, the foregoing can be accomplished by the method for preparing a polymerizable polyester resin mat from a polyester resin formulation by mixing different portions of the formulation comprising:

A. providing a portion of the formulation, the portion comprising an unsaturated polyester, an ethylenically unsaturated monomeric crosslinking agent capable of polymerizing with said polyester, and water, said portion being substantially viscosity stable;

B. providing another portion of the formulation, said other portion comprising: an ethylenically unsaturated monomeric crosslinking agent capable of polymerizing with said polyester, a chemical thickening agent and a thermoplastic polymer containing anhydride groups, said other portion being substantially viscosity stable;

C. preparing said formulation by mixing each of said portions to thoroughly distribute the ingredients thereof throughout the formulation; and D. forming a sheet of said formulation and applying thereto fibrous reinforcements;

wherein the amount of water and chemical thickening agent in said formulation effects thickening thereof in a manner such that the viscosity of said formulation is sufficiently low to wet thoroughly said fibrous reinforcements and such that the formulation containing said fibrous reinforcements increases rapidly in viscosity after said fibrous reinforcements have been applied.

There are several distinguishing and important characteristics of the inventive method described herein. One of the characteristics is that a non-thickenable thermoplastic does not have to be used in preparing the polyester resin mat. Thus, the thermoplastic used can be exclusively a thickenable thermoplastic which does not exude from the mat upon molding and curing thereof. This thickenable thermoplastic, that is, a polymer containing anhydride groups (hereafter referred to as "anhydride thermoplastic") can be incorporated into the thickening agent portion of the formulation, which contains also part of the crosslinking agent. As the anhydride thermoplastic is combined with the liquid crosslinking agent, it is dissolved or dispersed therein, thereby producing a liquid solution or mixture sufficiently high in viscosity to maintain the powdered thickening agent dispersed therein. Unlike heretofore known methods for preparing the thickening agent portion of the formulation, the selective combination of the thickenable anhydride thermoplastic and a particular thickening agent, described hereafter, forms a composition which does not increase in viscosity or does not increase excessively in viscosity, that is, it is substantially viscosity stable. This permits the thickening agent portion to be readily intermixed with the other portion of the formulation, the polyester portion. To accomplish this, the anhydride thermoplastic must be combined with a selective thickening agent which does not coact with the anhydride thermoplastic. Calcium oxide is such a thickening agent. Although there is no initial coaction between the anhydride thermoplastic and the selective thickening agent, after this portion of the formulation is mixed with the polyester portion, the anhydride thermoplastic is thickened by the thickening agent provided that sufficient water is present in the polyester portion as will be described more fully below.

It is also important that the thickening agent portion of the formulation be maintained free of water in amounts which cause the anhydride thermoplastic and thickening agent to coact with each other. In contrast, the use of thickenable acid functional thermoplastics in a thickening agent portion which is free of water or which contains water produces a composition which increases excessively in viscosity and is, thus, not viscosity stable.

Also critical to the invention is that there be included in the polyester portion of the formulation a sufficient amount of water which triggers thickening of the polyester and the anhydride thermoplastic when the polyester portion is combined with the thickening agent portion of the formulation. The amount of water utilized should be an amount such that thickening of the formulation is effected initially at a gradual rate so that when the fibrous reinforcements are added to the formulation, the viscosity thereof is sufficiently low to wet the fibrous reinforcements.

From the above, it should be appreciated that the present invention is based on the use of the combination of a particular thermoplastic polymer and a particular chemical thickening agent, and on the selective use of water. The practice of the present invention affords all of the following advantages, not all of which can be attained by preparing resin mats according to heretofore known methods: (A) the use only of a thickenable thermoplastic; (B) preparation of a viscosity stable chemical thickening agent portion of the formulation having a viscosity sufficiently high to maintain the powdered thickening agent therein; (C) the preparation of a viscosity stable polyester portion of the formulation; (D) the preparation of different portions of the formulation which have viscosities which allow the ultimate resin formulation to be prepared conveniently with ease of mixing in the absence of a rapid increase in viscosity which would make it impossible to well wet fibrous reinforcements that are added subsequently to the formulation; and (E) the preparation of a resin formulation which increases in viscosity rapidly after the fibrous reinforcements have been added to the formulation.

DETAILED DESCRIPTION OF THE INVENTION

It is believed that the polyester resin mats which are formulated in accordance with the present invention can be prepared most conveniently in an apparatus of the type that is shown schematically in FIG. 1.

With reference to FIG. 1, the polyester portion of the formulation is prepared by thoroughly mixing the unsaturated polyester, the crosslinking agent, and optional ingredients such as filler, free radical initiators and inhibitors. As mentioned above, water must be present in the polyester portion. If sufficient water is not present in the polyester or in the filler, water must be added to the polyester portion as will be described in detail below. The thickening agent portion is prepared by thoroughly mixing the anhydride thermoplastic, the chemical thickening agent and the remainder of the crosslinking agent and any optional ingredients such as a mold release agent and additional filler. As mentioned above, the thickening agent portion should be free of amounts of water which would cause the thickening agent to coact with the anhydride thermoplastic and thereby cause the thickening agent portion to increase in viscosity.

As shown in FIG. 1, each of the portions is mixed thoroughly in its respective mixer and is then fed by its respective metering pump to a mixer/dispenser in which each of the portions is intermixed thoroughly to provide the desired resin formulation. The metering pumps function to combine the portions in volumetric ratios which produce a resin formulation containing the desired amounts of ingredients. As mentioned above, it is preferred that each of the portions be formulated so that the amounts of ingredients therein are such that the portions can be combined in approximately a 1 to 1 volumetric ratio.

After intermixing thoroughly each of the portions in the mixer/dispenser, part of the resulting resin formulation is fed continuously through the line 1 onto a flexible film 2, such as a polyethylene film having a thickness of 8 mils. The flexible film is fed continuously from a roll 4 onto conveyor belt 6, supported by the rollers 7. The thickenable polyester resin formulation 8 deposited on the film 2 is spread uniformly thereover as it passes under the doctor blade 10. After passing under the doctor blade 10, fibrous reinforcements, such as chopped glass fibers, 12 are sprinkled uniformly on the layer 13 of the formulation carried along on the film 2. The chopped glass fibers are prepared conveniently in a glass chopper 14 into which glass roving, not shown, is fed. As will be explained more fully below, the viscosity of the layer 13 of formulation at the time the glass fibers 12 are deposited thereon is sufficiently low to enable the formulation to wet the glass fibers thoroughly.

The resin formulation containing the glass fibers is then covered with a top film 18, such as the aforementioned type of polyethylene film having thereon a layer of resin formulation 20. This is accomplished by feeding part of the resin formulation from the mixer/dispenser through line 3 to the film 18 fed from the roll 5. The resin formulation 9, deposited on the film 18, is spread uniformly thereover as it passes under the doctor blade 11. The film 18, having thereon the layer 20 of formulation and supported by the roller 15, passes over and under the compacting roller 22. The viscosity of the layer 20 is sufficiently high so that it does not run off the film 18, but is low enough to well wet the glass fibers 12 dispersed on the layer 13 as it comes into contact therewith. As the layers 13 and 20 are brought together, they are compacted by the compacting rollers 22 and 25 which apply sufficient pressure to the resulting sandwich to disperse the glass fibers 12 throughout the layer 24 of the resin formulation. The resulting sandwich or mat is then carried along on the conveyor belt 6 as it is wound on a take-up roll not shown. After the mat is formed, it increases rapidly in viscosity as explained more fully below.

It should be understood the aforementioned system for preparing thickened polymerizable polyester resin mats is illustrative, and that other systems can be used in the practice of the present invention. As will be explained in more detail below, optional ingredients of the resin formulation need not be added to the particular portions of the formulation shown in FIG. 1, and the filler can be incorporated in one or the other of the portions or distributed in the various portions from which the formulation is prepared.

The thickened polymerizable polyester resin formulation which comprises the resin mat can be tailor made to give a resin composition which upon being cured will have the properties which are desired in the article being manufactured. By way of example, there are set forth below formulations from which the resin mats can be prepared.

| Ingredients | Approximate Amounts, Wt. % | Approximate Amounts, Wt. % Preferred |
|---|---|---|
| unsaturated polyester | 5 to 30 | 10 to 20 |

-Continued

| Ingredients | Approximate Amounts, Wt. % | Approximate Amounts, Wt. % Preferred |
|---|---|---|
| crosslinking agent | 5 to 30 | 10 to 20 |
| thermoplastic polymer | 1 to 20 | 2 to 10 |
| chemical thickening agent | 0.05 to 3 | 0.1 to 1 |
| filler | 0 to 70 | 30 to 50 |
| fibrous reinforcements | 5 to 60 | 10 to 40 |

Unsaturated polyesters that can be utilized in the composition of this invention are those formed by condensing an ethylenically unsaturated dicarboxylic acid (usually alpha, beta ethylenic unsaturation) or anhydride thereof with a polyol such as a dihydric alcohol. A saturated dicarboxylic acid or anhydride thereof may be included also in this type of esterification polymerization. The unsaturated polyesters produced by such reactions are known, of course, as are processes for preparing them.

Examples of ethylenically unsaturated dicarboxylic acids and anhydrides that can be used to prepare the unsaturated polyesters are: maleic anhydride; fumaric acid; chloromaleic acid; itaconic acid; citraconic acid; and mesaconic acid. Examples of dihydric alcohols that can be used to prepare the unsaturated polyesters are: ethylene glycol; propylene glycol; butylene glycol; diethylene glycol; dipropylene glycol; triethylene glycol; isopropylidene bis- (p-phenyleneoxypropanol-2); cyclohexanedimethanol; neopentyl glycol; and cyclobutanediol. Examples of saturated dicarboxylic acids and anhydrides that can be used in preparing the unsaturated polyesters are: phthalic anhydride; isophthalic acid; tetrahydrophthalic anhydride; succinic acid; glutaric acid; adipic acid; pimelic acid; suberic acid; azelaic acid; and sebacic acid. In addition, unsaturated polyesters that can be used in this invention can be ones which contain alcohols having more than two hydroxyl groups, or acids, either saturated or unsaturated, containing more than two carboxyl groups. Examples of such ingredients are glycerol; pentaerythritol; trimellitic acid; and pyromellitic acid.

The acid number and the molecular weight of the unsaturated polyesters can vary over a wide range, for example, from about 10 to about 100 and from about 750 to about 5,000 respectively. Preferably, the acid number should be less than about 35 and the molecular weight within the range of about 1,000 to about 3,000.

The reactivity of the unsaturated polyester resin should be within the range of about 20 to about 100 mol per cent of the total acid component of the resin and preferably within the range of about 50 to about 100.

The particular unsaturated polyester used in the formulation should be selected on the basis of the desired properties of the articles that are being made. In producing articles where the surface properties are extremely important and where good overall strength is desired, it is preferred to use resins that are prepared by condensing maleic anhydride and propylene glycol or by condensing propylene glycol, dipropylene glycol, maleic anhydride and isophthalic acid.

The crosslinking agent is an ethylenically unsaturated monomer which is capable of polymerizing with the unsaturated polyester and should be capable of dissolving the unsaturated polyester. Examples of crosslinking agents are styrene, vinyl toluene, diallyl phthalate, alpha-methyl styrene and methylmethacrylate. Mixtures of crosslinking agents can be used. It is preferred to utilize styrene as the crosslinking agent.

The formulation comprising the resin must contain also an anhydride thermoplastic that is effective in reducing the shrinkage of the polyester formulation as it cures. The anhydride thermoplastic contains anhydride groups

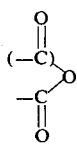

and is soluble or dispersible in the crosslinking agent. The anhydride thermoplastic should not contain carboxyl groups in amounts which would cause the thermoplastic to coact with the chemical thickening agent thereby rendering the chemical thickening agent portion "viscosity unstable." Preferably, the anhydride thermoplastic contains no carboxyl groups.

Preferably, styrene-maleic anhydride copolymer is used. Speaking generally, a styrene-maleic anhydride copolymer can be prepared by reacting maleic anhydride with styrene at elevated temperature. (See, for example, the following U.S. Pat. Nos. 2,866,771; 2,971,939 and 2,989,517.) The molar or weight ratio of styrene to maleic anhydride present in the polymer can vary over a wide range. (It is noted that the molecular weights of styrene (104) and maleic anhydride (98) are very close to each other so that the molar ratio of one to the other is approximately the same as their weight ratios.) For example, the copolymer can be prepared to contain approximately equal weight (molar) proportions of styrene and maleic anhydride or a major weight (molar) proportion of styrene.

Excellent results have been attained by using styrene-maleic anhydride copolymer which is commercially available at a relatively low cost.

It is preferred to utilize a styrene-maleic anhydride copolymer wherein the maleic anhydride comprises about 2 wt. % to about 15 wt. % of the copolymer. However, it should be understood that the copolymer can contain somewhat lower amounts of the maleic anhydride or higher amounts thereof. Furthermore, it should be understood that when the term "styrene-maleic anhydride copolymer" is used herein and in the claims, it includes within its meaning copolymers that contain substituents on the benzene ring or the alkenyl portions of the styrene, and also polymers which contain in the polymeric chain small amounts of other materials such as, for example, alpha-methyl styrene. Examples of the aforementioned substituents are chloro and lower alkyl groups. Polymers containing such groups can be prepared, for example, by reacting chloro-styrene or vinyl toluene with maleic anhydride. Polymers containing amounts of other materials in the polymer chain can be prepared, for example, by reacting styrene, maleic anhydride and the unsaturated dimer of alpha-methyl styrene.

The molecular weight of the styrene-maleic anhydride copolymer may vary over a wide range, for example, from about 2,000 to about 300,000. Preferably, it should have a molecular weight within the range of about 80,000 to about 200,000.

Specific examples of styrene-maleic anhydride copolymers that can be used in practicing this invention are as follows: a copolymer containing about 75 wt. % styrene and about 25 wt. % maleic anhydride and having a molecular weight of about 2,000; a copolymer containing about 90 wt. % styrene and about 10 wt. % maleic anhydride and having a molecular weight of about 80,000; a copolymer containing about 92 wt. % styrene and about 8 wt. % maleic anhydride and having a molecular weight of about 98,000; and a copolymer containing about 98 wt. % styrene and about 2 wt. % maleic anhydride and having a molecular weight of about 125,000. These are but a few of the examples of styrene-maleic anhydride copolymers that can be used. It should be understood that other copolymers of different molecular weight, different proportions of styrene and maleic anhydride, and those containing other ingredients in the polymeric chain can be used provided that the polymer is soluble or dispersible in the crosslinking agent. Mixtures of different styrene-maleic anhydride copolymers may be used also in the compositions within the scope of this invention.

Other anhydride thermoplastics including homopolymers and copolymers prepared from two or more monomers, can be used in the practice of the present invention. Anhydride thermoplastics and their methods of preparation are known. For example, they can be prepared by reacting an ethylenically unsaturated anhydride, for example, itaconic, maleic or citraconic anhydride with a vinyl monomer, for example: alkyl vinyl ether such as methyl vinyl ether; olefins such as ethylene, propylene, isobutylene and hexene; vinyl acetate; alkyl methacrylates; acrylonitrile; vinyl toluene; chlorostyrene; vinyl chloride; and vinylidene chloride. Anhydride thermoplastics can be prepared also by introducing the anhydride groups into the polymer after it is prepared or by converting substituents of the polymer, for example, acid groups, to the anhydride groups. The molecular weight and anhydride content of such anhydride thermoplastics can vary over a wide range, for example, from about 1,000 to about 200,000 and 1 to about 75 wt. % respectively.

Although it is not necessary, non-thickenable thermoplastics and thickenable thermoplastics containing acid functionality can be incorporated in the resin formulation. Examples of non-thickenable thermoplastics that can be used are homopolymers of: styrene; vinyl toluene; ethylene; methacrylates; alkyl methacrylates; acrylates; and alkyl acrylates. Additional examples of non-thickenable thermoplastics are copolymers of: vinyl chloride and vinyl acetate; styrene and acrylonitrile; methyl methacrylate and alkyl esters of acrylic acid; methyl methacrylate and styrene; and methyl methacrylate and acrylamide. The aforementioned examples are illustrative and other non-thickenable thermoplastics prepared from one or more monomers containing reactive ethylenic unsaturation, can be used also. The non-thickenable thermoplastic can be incorporated in the polyester portion or the thickening agent portion of the formulation.

In general, the thickenable thermoplastic is a polymer containing about 0.1 to about 5 wt. % of acid functionality in forms such as carboxyl groups, sulfonic acid groups, phosphonic acid groups, phosphoric acid groups, etc. The acid functional groups in the thermoplastic can be incorporated in the polymer after the formation thereof or by preparing the polymer from a monomer that contains acid functionality. Examples of such polymers include copolymers prepared by reacting monomers such as itaconic acid, maleic acid, acrylic acid, methacrylic acid, p-vinylbenzoic acid and vinylsulfonic acid with reactive ethylenically unsaturated monomers such as styrene, alkyl acrylates, alkyl methacrylates, acrylonitrile and a mixture of vinyl chloride and vinyl acetate. The aforementioned examples are illustrative and other thickenable, acid functional thermoplastics can be used also. The thickenable, acid functional thermoplastic must be added to the polyester portion of the formulation and not to the thickening agent portion; otherwise, the acid functional polymer and thickening agent would coact and render the thickening agent portion "viscosity unstable."

The thermoplastic polymer should comprise about 1 to about 20 wt. % of the resin mat, and preferably comprises exclusively the anhydride thermoplastic. If a non-thickenable thermoplastic and/or a thickenable, acid functional thermoplastic is incorporated into the formulation also, it should comprise about 0.5 to about 10 wt. % of the resin mat.

The selection of the proper chemical thickening agent to incorporate into the resin formulation via the thickening agent portion from which the formulation is made is critical to the practice of the present invention. Many agents have been reported as being effective in thickening polyester resin formulations to a sufficiently high viscosity such that the formulation exists in a dry, non-tacky, semi-solid polymerizable form. Such thickening is believed to be effected by the coaction of the thickening agent and the carboxyl groups of the polyester and not by copolymerization between the unsaturated polyester and crosslinking agent. Examples of reported thickening agents include oxides and hydroxides of the metals of Groups I and II of the Periodic Table. (For example, see U.S. Pat. Nos. 2,628,209; 3,390,205; 3,431,320; and 3,631,217.) Specific examples of reported chemical thickening agents include magnesium oxide, zinc oxide, potassium hydroxide, calcium oxide, calcium hydroxide, copper oxide and magnesium hydroxide.

Of the many available reported thickening agents, the agent to be used in the practice of the present invention must be one which does not coact with the anhydride thermoplastic when these two constituents are combined in the thickening agent portion from which the resin formulation is prepared. Calcium oxide is such a thickening agent. On the other hand, other thickening agents have been found to coact with anhydride thermoplastics and acid functional thickenable thermoplastics when mixed therewith in the thickening agent portion thereby rendering it "viscosity unstable." It has been found also that calcium oxide coacts with acid functional thermoplastics in the thickening agent portion thereby rendering it viscosity unstable. Thus, calcium oxide and anhydride thermoplastics are a selective combination for use in the practice of the present invention. It is very much preferred to use only calcium oxide as the thickening agent. However, if the user is willing to tolerate some increase in the viscosity of the portion, then another thickening agent can be combined with the calcium oxide. However, the calcium oxide should comprise at least about 80 wt. % of the thickening agents used to avoid undue increases in viscosity of the portion.

Any of the available fillers which are incorporated in polyester resin formulations can be added to the resin formulation. Examples of fillers are calcium carbonate, clays, calcium silicate, and talc. The filler functions to extend the formulation, thereby reducing cost, and to change or improve the properties of the resin formulation and the cured article made therefrom.

The preferred fibrous reinforcements of the resin formulation is chopped glass fibers. However, other forms of the glass fibers and other types of fibrous reinforcements can be used, for example, asbestos, organic synthetic fibers such as acrylonitrile and linear polyester fibers. The fibrous reinforcements function to improve the strength of the articles made from the resin formulation.

Other materials which are generally incorporated into polymerizable unsaturated polyester resin formulations to obtain special effects may also be used in the compositions included within the scope of this invention in functional amounts well known in the art. Thus, initiators or catalysts, crosslinking and stabilizing inhibitors, accelerators or promoters, pigments and mold release additives, etc. can also be incorporated in the composition. Examples of initiators or catalysts that can be used are t-butyl perbenzoate, t-butyl hydroperoxide, succinic acid peroxide and cumene hydroperoxide. Examples of crosslinking and stabilizing inhibitors that can be used are hydroquinone and t-butyl catechol. Examples of accelerators or promoters which can be used are cobalt naphthenate, diethyl aniline and dimethyl aniline. Examples of pigments that can be utilized are iron oxides, titanium dioxide and phthalocyanins.

Turning now to a more detailed description of the polyester portion and thickening agent portion from which the resin formulation is prepared, there are set forth below the essential ingredients comprising each of these portions and exemplary amounts of the ingredients of each portion.

| Polyester Portion | Approximate Amts., wt.% |
|---|---|
| (A) unsaturated polyester | 10 to 50 |
| (B) crosslinking agent | 3 to 60 |
| (C) water | 0.01 to 0.5 |
| (D) filler | 0 to 80 |

| Thickening Agent Portion | Approximate Amts., wt. % |
|---|---|
| (A) crosslinking agent | 30 to 80 |
| (B) anhydride thermoplastic | 5 to 60 |
| (C) thickening agent | 0.1 to 10 |
| (D) filler | 0 to 80 |

It should be understood that the amounts of ingredients comprising each of the portions may fall somewhat outside the ranges given above and that the specific amounts for a particular application will depend on and be governed by considerations mentioned hereafter.

Preferably, the amounts of ingredients comprising each of the portions should be such that the viscosities thereof will permit the portions to be intermixed readily. It is preferred that the viscosity of one portion not vary by more than a factor of four from the viscosity of the other portion. Most preferably, the viscosity of each of the portions is substantially equal. Exemplary viscosities of the portions are about 10,000 to about 150,000 cp. Also, it is most preferred that the ingredients comprising each of the portions be present in amounts such that the portions can be combined in approximately a 1 to 1 volumetric ratio to produce the desired resin formulation. This is not necessary, but by so formulating the portions, extreme accuracy in pumping requirements is not needed. For example, if the pump drifts by a specific amount, the relative error introduced into the resulting resin formulation will be substantially less if the portions are combined in approximately a 1 to 1 volumetric ratio than if they were combined in a 20 to 1 volumetric ratio. However, the volumetric ratio of the polyester/thickening agent portions can vary over a wide range if this is found to be convenient, for example, within a range of 0.5:1 to about 20:1 or higher.

The polyester portion should contain sufficient cross-linking agent to dissolve substantially all of the polyester. The amount of water in the polyester portion should be sufficient to initiate thickening of the combined polyester and thickening agent portions. It is noted that in the manufacture of unsaturated polyesters, it is not unusual to have residual water contained therein since water is a byproduct of the polyesterification reaction. Also, various of the fillers used in the resin formulation may contain water. The water content of the polyester and fillers may be sufficient to initiate thickening. However, if sufficient water is not present, then additional water must be added to the polyester portion.

As to the amounts of ingredients in the thickening agent portion, the amount and proportion of the cross-linking agent and anhydride thermoplastic should be sufficient to provide a formulation sufficiently high in viscosity to maintain the powdered thickening agent uniformly dispersed therethrough. It is noted that the thickening agent portion must be free of amounts of water which would cause the thickening agent and anhydride thermoplastic to coact, and thereby render the portion viscosity unstable. Following this guideline, it has been found that the thickening agent portion can remain viscosity stable for substantial periods of time, for example, as long as several weeks. The stability in viscosity is important because it will usually be convenient at the beginning of a manufacturing day to prepare the thickening agent portion in an amount which can be fed continuously throughout the day for intermixing with the polyester portion.

Optional ingredients can be incorporated in one or more of the portions of the formulation as is desired and found to be most convenient. If one or more of the optional ingredients is a material which contains residual water or functional groups which cause the thickening agent and anhydride thermoplastic to coact, the optional ingredient should be incorporated in the polyester portion in order to avoid rendering the thickening agent portion viscosity unstable.

When the polyester and thickening agent portions are intermixed, the thickening agent, aided by the water present in the polyester portion, begins to react with the polyester to thicken the formulation. Also, the anhydride thermoplastic, and any acid functional thermoplastic that may be included in the polyester portion, begin to react with the thickening agent, aided by the water that is present. As each of the portions is intermixed, the thickenable thermoplastics are incorporated uniformly throughout the resin formulation in a form in which they do not exude therefrom when the formulation is molded and cured. The formulation thickens at a gradual rate initially and thereafter usually at a faster rate. Thus, after the portions of the formulation are mixed thoroughly, the formulation should be fed promptly to the carrier film and combined with the fibrous reinforcements while the viscosity of formulation is low enough to well wet the fibrous reinforcements. This, as mentioned above, yields a cured product of improved strength. The viscosity of the formulation when the fibrous reinforcements are added thereto may vary depending on the particular resin formulation used, the type of fibrous reinforcements, etc. However, for exemplary purposes, it is noted that good wetting of fibrous reinforcements can be achieved when the viscosity of the resin formulation does not exceed about 150,000 cps. In general, the lower the viscosity of the resin formulation, the better the formulation will wet the fibrous reinforcements. It has been found that if the viscosity of the resin formulation is above about 150,000 cp when the fibrous reinforcements are added, difficulties are encountered in obtaining good wetting of the fibrous reinforcements. (It is noted that such difficulties are generally less severe when the fibrous reinforcements are present in relatively small amounts, for example, below about 20 wt. % of the resin mat.) The present invention provides the means for preparing a resin formulation which has an initial viscosity below about 150,000 cp, for example, as low as 20,000 cp or lower, and which formulation will not increase excessively in viscosity, for example, in excess of 150,000 cp prior to its being combined with the fibrous reinforcements. It is noted that time from the period when each of the portions is mixed to prepare the formulation to the time when the fibrous reinforcements are added may be about 1 to about 5 minutes. After the fibrous reinforcements are added, the viscosity of the resin formulation should increase to about 100,000 to about 1,000,000 cp within about 10 to about 30 minutes to provide a thickened resin mat.

EXAMPLES

The first group of examples illustrates a viscosity stable thickening agent portion which contains styrene-maleic anhydride copolymer and calcium oxide thickening agent in accordance with this invention, and a thickening agent portion which is not viscosity stable and which contains styrene-maleic anhydride copolymer and a different thickening agent system. The following control composition, having an initial viscosity of about 25,000 cp at 75°F was prepared:

| Ingredient | Parts by wt. |
| --- | --- |
| styrene solution containing 39 wt. % of styrene-maleic anhydride copolymer having a molecular weight of about 80,000 and containing 90 wt. % styrene and 10 wt. % maleic anhydride. | 76.5 |
| styrene solution containing 35 wt. % of non-thickenable thermoplastic consisting of poly(methylmethacrylate) | 14.1 |
| zinc stearate (mold release additive) | 9.5 |
| thickening agent | as indicated in the examples which follow |

To samples of the above control composition, there were uniformly mixed therein the following thickening agents in the amounts indicated (wt. % based on combined weight of both styrene solutions.)

Table 1

| Ex. No. | Thickening Agent | Amt. of Thickening Agent, wt. % |
|---|---|---|
| 1 | calcium oxide (CaO) | 2.3 |
| 2 | calcium oxide (CaO) | 1.93 |
| 3 | calcium oxide (CaO) | 1.29 |
| Comp. Exs. | | |
| A | mixture of CaO & Ca(OH)$_2$ | 1.17 CaO & 1.77 Ca(OH)$_2$ |
| B | MgO | 1.6 |
| C | Ca(OH)$_2$ | 2.92 |
| D | Ca(OH)$_2$ and water | 2.91 Ca(OH)$_2$ and 0.42 H$_2$O |

The viscosities of each of the above examples, Examples 1–3 within the scope of the present invention, and comparative Examples A–D, were measured and recorded after the periods of time indicated in Table 2 below.

Table 2

| Ex. No. | Viscosity in cps (77°F) at Time Indicated | | | | | | |
|---|---|---|---|---|---|---|---|
| | 1 hr. | 2 hr. | 1 day | 4 days | 1 wk. | 2 wk. | 1 mo. |
| 1 | —* | — | 24,000 | 23,000 | 26,000 | 25,000 | 22,000 |
| 2 | — | — | 27,000 | 24,000 | 28,000 | 27,000 | 21,000 |
| 3 | — | — | 23,000 | 23,000 | 25,000 | 24,000 | 21,000 |
| A | 70,000 | 66,000 | 140,000[(1)] | — | — | — | — |
| B | 50,000 | 160,000[(1)] | — | — | — | — | — |
| C | 1,200,000 | >2,000,000[(1)] | — | — | — | — | — |
| D | [(2)] | — | — | — | — | — | — |

*The "—" means not recorded
[(1)]At the times indicated, these compositions were rubbery gel-like mixtures which were unacceptable for mixing with a polyester portion
[(2)]At the end of 1 minute, this composition had a viscosity in excess of 2,000,000 cp and was a rubbery gel-like mixture which was unacceptable for mixing with a polyester portion.

The compositions of Examples 1 to 3 show clearly that the compositions containing calcium oxide are substantially stable in viscosity. On the other hand, Examples A–D show that the use of other thickening agents produces compositions which are not stable in viscosity.

The next comparative example illustrates the importance of maintaining the thickening agent portion of the formulation free of amounts of water which cause the thickening agent portion to increase in viscosity thereby rendering the portion unstable in viscosity.

EXAMPLE E

To the above described control composition, there were added 2.2 wt. % of calcium oxide and 1.13 wt. % water. The viscosity of the composition increased as follows: after 1 minute — 200,000 cp; after 5 minutes — about 2,000,000 cp; and after 30 minutes — greater than 2,000,000 cp. The form of the composition at the end of 30 minutes was a rubbery gellike mixture which would not be satisfactory for mixing with a polyester portion of the formulation.

It is noted that a comparision of Example E with Example 1 illustrates strikingly the adverse effect that water has on the viscosity stability of the thickening agent portions.

The next example illustrates the formation of a resin mat in accordance with this invention. Unless stated otherwise, the amounts of the ingredients are given in parts by weight.

EXAMPLE 4

The polyester portion of the formulation was prepared in the following manner. An unsaturated polyester (8.22 parts), prepared by reacting maleic anhydride and propylene glycol (1.0 to 1.05 molar ratio) to a number average molecular weight of about 1,200 and acid number of about 25–30, was dissolved in 22.6 parts of styrene. To this solution was added 0.15 parts water, 0.463 parts t-butyl perbenzoate (catalyst) and 68.5 parts calcium carbonate (filler). This mixture had an initial viscosity of about 25,000 cp at 77°F and a density of 1.85 g/cc.

The thickening agent portion of the formulation was prepared in the following manner. Styrene-maleic anhydride copolymer (33.9 parts) containing 90 wt. % styrene and 10 wt. % maleic anhydride and having a weight average molecular weight of about 80,000 was dissolved in 54.6 parts styrene. To this solution was added 9.25 parts of zinc stearate (mold release additive) and 2.23 parts of calcium oxide thickening agent. This mixture had a viscosity of about 30,000 cp at 77°F and a density of 1.0 g/cc.

The polyester and thickening agent portions described above were thoroughly blended at a 5.3 to 1 weight ratio (3.36 to 1 volumetric ratio) by metering through two appropriately adjusted synchronous pumps into a continuous mixer/dispenser apparatus. The viscosity of the total paste mixture immediately upon mixing was about 20,000 cp at 88°–90°F. The paste mixture was combined with chopped glass fibers having a length of 1 inch and formed into a mat in the general manner shown in FIG. 1. The chopped glass fibers comprised about 30 wt. % of the mat. At the time the fibers were combined with the paste mixture, it had a viscosity of about 20,000 to 25,000 cp. The fibers were well wetted by the paste mixture. Within 30 minutes after the addition of the fibers, the paste mixture had a viscosity well in excess of 100,000 cp at room temperature.

Polyester resin mats made in accordance with Example 4 were cured and molded in a matched metal mold at a temperature of about 300°F and die pressures ranging from about 400 to about 1,500 psi for 3 to 5 minutes. The molded parts had smooth surfaces which were free of fiber prominance, "sink" areas and other imperfections generally associated with cure shrinkage. Evaluation of the mechanical properties of the molded parts showed that the use of the "anti-shrink" thermoplastic polymer did not affect such properties adversely.

EXAMPLE 5

There was prepared a resin mat the same in all respects as that of Example 4 except that about one-half of the styrene-maleic anhydride copolymer was replaced by polymethylmethacrylate, a non-thickenable thermoplastic. The viscosities of the thickening agent portion and the mixed paste, were substantially the same as those of Example 4. Resin mats were molded and cured into articles having excellent surface properties.

In summary it can be said that the present invention provides improved means for economically preparing uncured polyester resin mats which can be molded and cured into thermoset articles having improved surface properties.

I claim:

1. A method for preparing a polymerizable polyester resin mat from a polyester resin formulation by mixing different portions of the formulation comprising:
    A. providing a portion of the formulation, the portion comprising an unsaturated polyester, an ethylenically unsaturated monomeric cross-linking agent capable of polymerizing with said polyester, and water, said portion being substantially stable in viscosity;
    B. providing another portion of the formulation, said another portion comprising an ethylenically unsaturated monomeric cross-linking agent capable of polymerizing with said polyester, thickening agent and a thermoplastic polymer containing anhydride groups, said another portion being free of water in amounts which cause said thermoplastic polymer and said thickening agent to coact with each other thereby rendering said other portion substantially stable in viscosity;
    C. preparing said formulation by separately mixing each of said portions to thoroughly distribute the ingredients thereof throughout each portion, and then mixing said portions together; and
    D. promptly after mixing said portions together, forming an uncured sheet of said formulation and applying thereto fibrous reinforcements;

wherein said thickening agent is calcium oxide only or a mixture of calcium oxide and another thickening agent in which calcium oxide comprises at least about 80 weight percent of said mixture and wherein the amount of water and thickening agent in said formulation effects thickening thereof in a manner such that the viscosity of said formulation is sufficiently low to wet thoroughly said fibrous reinforcements and such that the formulation containing said fibrous reinforcements increases rapidly in viscosity after said fibrous reinforcements have been applied.

2. A method according to claim 1 wherein said thickening agent is calcium oxide only.

3. A method according to claim 1 wherein said thermoplastic polymer is styrene-maleic anhydride copolymer.

4. A method according to claim 1 wherein the viscosities of each of said portions is approximately equal.

5. A method according to claim 1 wherein said formulation is prepared by intermixing each of said portions in an approximately equal volumetric ratio.

6. A method according to claim 1 wherein the viscosities of each of said portions is approximately equal and wherein said formulation is prepared by intermixing each of said portions in an approximately equal volumetric ratio.

7. A method according to claim 6 wherein said thickening agent is calcium oxide only and wherein said thermoplastic is styrene-maleic anhydride copolymer.

8. A method according to claim 1 wherein the viscosity of each of portions (A) and (B) is about 10,000 to about 150,000 cp, wherein the viscosity of said formulation at the time said fibrous reinforcements are applied thereto is not in excess of about 150,000 cp and wherein the fibrous reinforced formulation has a viscosity of about 100,000 to about 1,000,000 within about 10 to about 30 minutes after preparation thereof.

9. A method according to claim 8 wherein said thickening agent is calcium oxide only and said thermoplastic polymer is styrene-maleic anhydride copolymer.

* * * * *